United States Patent Office 2,868,099
Patented Jan. 13, 1959

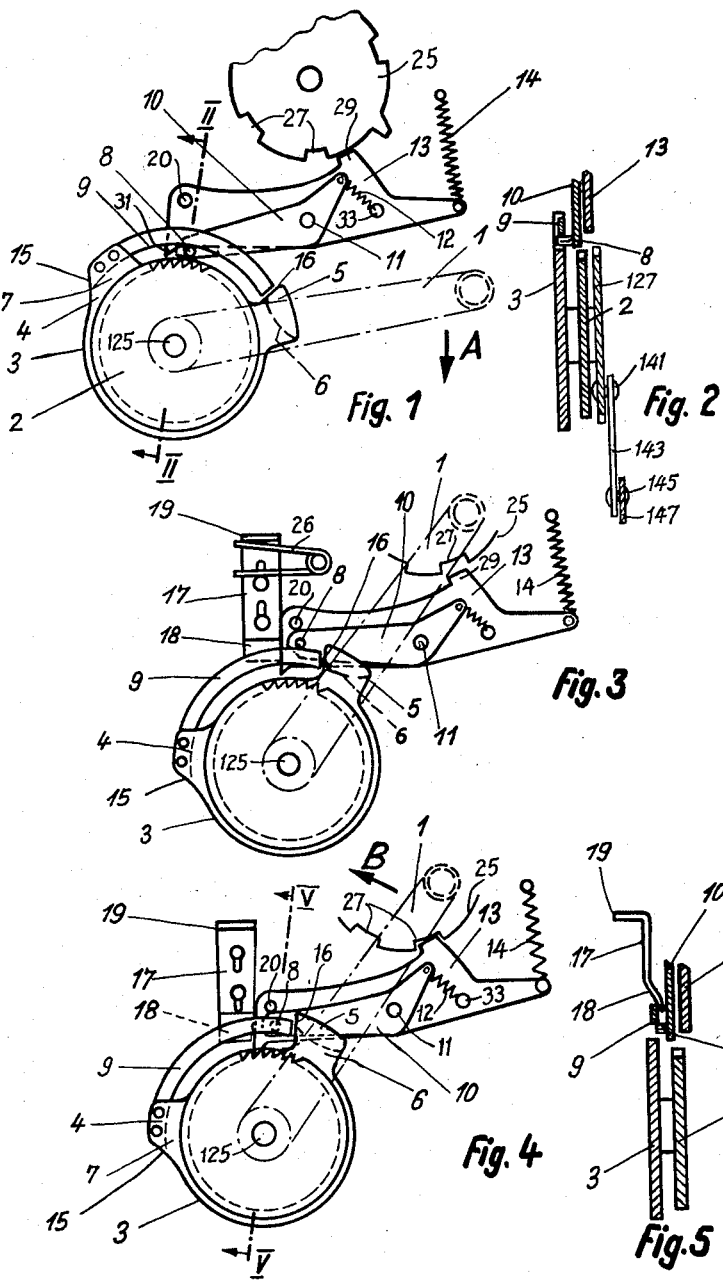

2,868,099

INTERCONNECTED FILM FEED AND SHUTTER SETTING MECHANISM FOR PHOTOGRAPHIC CAMERAS

Richard Weiss, Braunschweig, Germany, assignor to Franke & Heidecke, Fabrik Photographischer, Präzisions-Apparate, Braunschweig, Germany, a firm of Germany Application January 17, 1956, Serial No. 559,723

Claims priority, application Germany May 23, 1950

12 Claims. (Cl. 95—31)

This invention relates to an interconnected film feed and shutter setting mechanism for photographic cameras.

It is well known in the art to provide a photographic camera with a manually operable lever (usually in the form of a crank) which is effective, upon movement in one direction, to perform the two functions of setting or tensioning the shutter ready for the next exposure, and feeding or traversing the film to bring a fresh unexposed area into the focal plane of the shutter. This known mechanism is valuable in preventing accidental double exposures, or in preventing accidental failure to tension the shutter when the film has been fed.

There are some occasions, however, when it is purposely desired to make a double exposure on a single area of the film. For example, a double exposure may be desired when taking a picture intended to show several phases of motion of certain moving parts, or to obtain a more life-like image of moving things such as a waterfall. It may also be desirable to make a double exposure in order to avoid useless waste of film, when the first exposure on a given film area has resulted in no image on the film; e. g., when a flashbulb fails to flash upon attempting to make a flashlight exposure.

An object of the present invention is the provision of simple and inexpensive means whereby the film feed and the shutter tensioning mechanism are normally interconnected with each other in known manner, and whereby the shutter may be separately tensioned without feeding the film, when it is desired purposely to make a double exposure.

Another object is the provision of such mechanism in a form which does not reduce, but rather retains, all the safeguards against double exposure which are normally present in the conventional film feeding and shutter setting mechanism of known form.

These and other desirable objects may be attained in the manner disclosed as an illustrative embodiment of the invention in the following description and in the accompanying drawings forming a part hereof, in which:

Fig. 1 is a diagrammatic side elevation of the film feeding and shutter setting lever or crank in a position after turning through more than one complete rotation, together with associated locking and controlling parts;

Fig. 2 is a section taken substantially on the line II—II of Fig. 1;

Fig. 3 is a view similar to a portion of Fig. 1, showing the parts in a different position with the operating lever or crank swung back approximately to its rest position;

Fig. 4 is a view similar to Fig. 3 except for the shifting of certain parts so as to permit the tensioning of the shutter without feeding the film;

Fig. 5 is a section taken approximately on the line V—V of Fig. 4;

Figure 7:
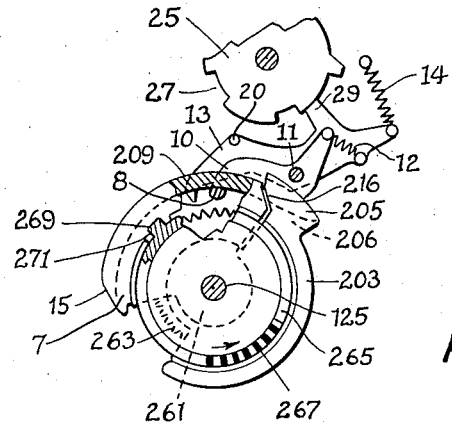
Fig. 7 is a view partly in side elevation and partly in vertical section, similar in general to Fig. 1, illustrating a modified construction and with the parts in the position assumed after completing one full revolution and part of a second revolution.
Figure 8:
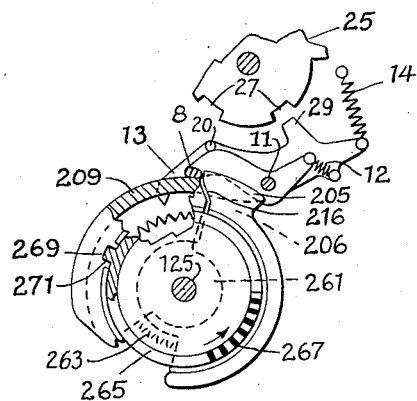
Figure 9:
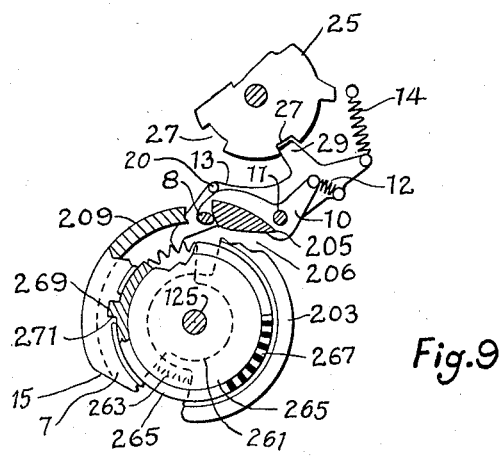

Fig. 8 is a view similar to Fig. 7, showing the parts of the modified construction in the normal rest position assumed when the winding of one frame of film has been completed and the crank handle has been restored to normal rest position; and Fig. 9 is a view similar to Fig. 8, except that the parts have been specially released ready for a reverse crank movement to tension the shutter without winding the film.

The same reference numerals throughout the several views indicate the same parts.

Figure 6:
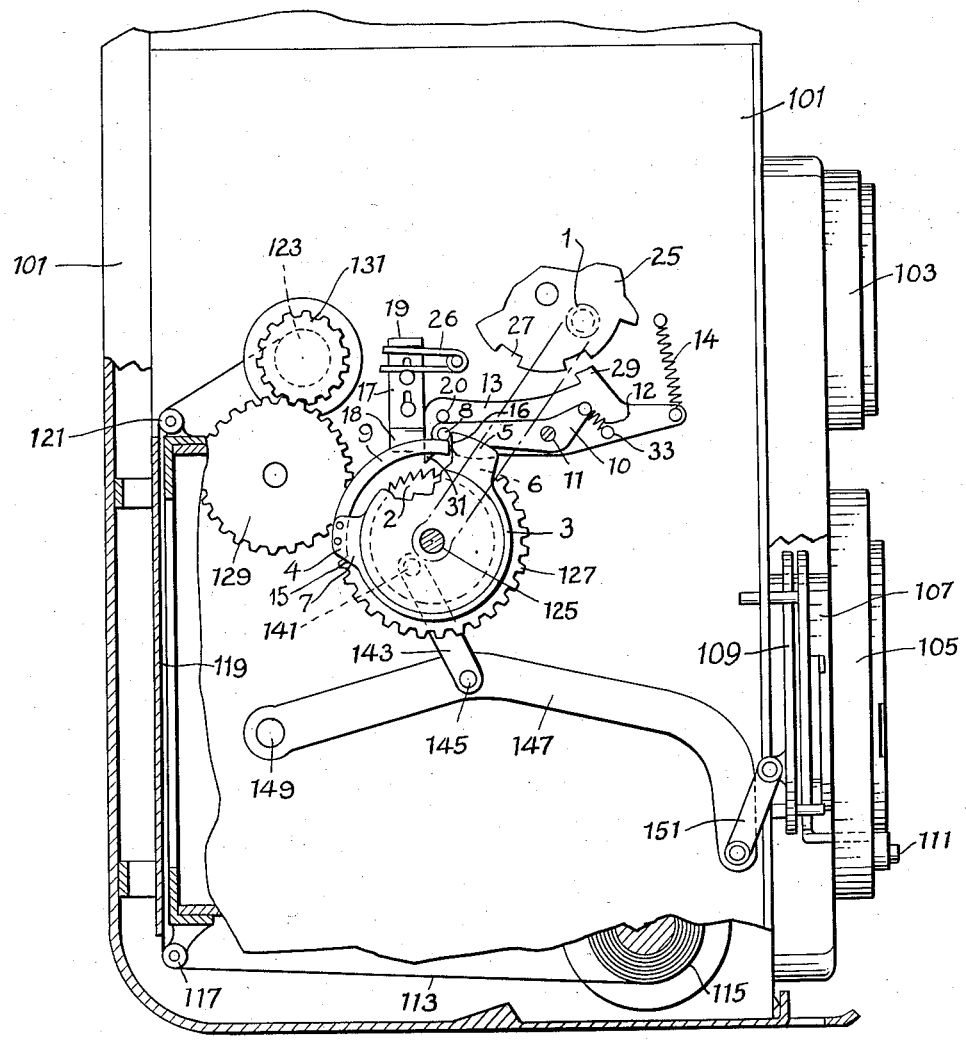
Fig. 6 is a diagrammatic and fragmentary side elevation of a camera equipped with the present invention.

Referring first to the diagrammatic side view, Fig. 6, there is shown in general at 101 a camera body, preferably of the twin lens reflex type (although the invention is not limited to a camera of this type) and more specifically a camera of the kind well known on the market under the trademark "Rolleiflex," as manufactured by the firm of Franke & Heidecke in Braunschweig, Germany, and widely sold in the United States and elsewhere. Such a camera includes an upper or finder lens in a mount 103, and a lower or picture taking lens in a mount 105 secured to an objective shutter 107, which shutter is cocked or tensioned for making an exposure by turning a tensioning ring 109 rotatably mounted on the shutter casing, and which is released for making an exposure by depressing a release plunger or trigger plunger 111.

The film 113 is held on a film supply roll 115, and as it is withdrawn therefrom it extends rearwardly to a guide roller 117, thence upwardly to the focal plane of the camera at 119, in which position it is exposed to light entering through the shutter 107 when the latter is opened to make an exposure. Above the focal plane the film passes over another guide roller 121 and to a film take-up spool 123 on which the exposed film is wound.

Rotatably mounted on the right hand side wall of the camera body is a shaft 125 carrying at its outer end an external crank arm 1 by means of which the shaft may be rotated. Within the side wall through which the shaft extends, the shaft is provided with a toothed ratchet wheel 2 (see, from here on, Figs. 1–5 as well as Fig. 6) and a cam disk 3, as well as a gear 127. This gear 127 meshes with a gear 129 which meshes with a pinion 131 operatively connected to the film take-up spool or rewinding spool 123. At a suitable point in the train of gears 127, 129, 131 is a one-way clutch of any suitable known construction so arranged that when the crank 1 and shaft 125 are turned in a clockwise direction, the take-up spool 123 will also be turned in a clockwise direction to wind the exposed film thereon; but when the crank 1 and shaft 125 are turned counterclockwise, no motion will be transmitted to the spool 123. Conveniently the one-way clutch is built directly into the hub of the gear 131.

On the inner face of the gear 127 is a crank pin 141 on which is pivoted the upper end of a link 143, the lower end of which is pivoted at 145 to a shutter tensioning link or arm 147 which extends parallel to the side wall of the camera and is pivoted on a fixed pivot 149 at its rear end. The front end of this arm 147 is pivotally connected by an intermediate link 151 to a lug on the shutter tensioning ring 109. As the crank 1 and shaft 125 are turned in either direction, the crank pin 141 will raise and lower the link 143, thereby raising and lowering the front end of the arm 147 so that the tensioning ring 109 is turned first in one direction and then back to its initial position, thereby tensioning the shutter 107 ready for the next exposure.

From this it will be seen that when the crank arm 1 and shaft 125 are turned in a clockwise direction, the shutter will be tensioned and the film will be wound onto the take-up spool 123. When the crank and shaft are turned in the opposite or counterclockwise direction, the shutter will likewise be tensioned but the film will not be wound, on account of the one-way clutch connection which is built into the hub of the gear 127.

The parts thus far described are conventional and may be varied in detail to a considerable extent, without departing from the present invention. They are here described in general terms merely for the sake of a better understanding of the background and purposes of the present invention. These parts may be constructed, for example, in the particular form disclosed in U. S. Patent 2,148,636, granted February 28, 1939, on an application of Muller and Priesemann, to which reference is made for further details which are not important for present purposes.

The conventional known construction also includes a metering disk 25 (corresponding, e. g., to the metering disk 19 in said Patent 2,148,636) which is turned from the feeding movement of the film by suitable intermediate driving mechanism as disclosed in said patent, and which is provided on its periphery with various metering notches 27 adapted to cooperate with a nose 29 on a stop lever 13 which is pivoted in the shutter casing on a fixed pivot 11, and which is urged by a spring 14 in a direction to tend to move the nose 29 into a notch 27 of the metering disk 25, whenever such a notch comes opposite the nose 29 during the rotation of the disk. When this occurs, the opposite or pointed end 31 of the lever 13, constituting a stop pawl drops into one of the notches of the ratchet 2 and prevents further rotation of this ratchet, thereby stopping the clockwise turning movement of the crank 1 and shaft 125 in known manner, at the proper point when the exposed frame or film area has been drawn out of the focal plane 119 and when a fresh or unexposed area of the film has been advanced into the focal plane. This engagement of the pawl nose 31 in the teeth of the ratchet 2 does not prevent counterclockwise turning of the crank, shaft, and ratchet, however.

Mounted on the same pivot 11 on which the lever 13 is pivoted, is a second lever 10, the tail end of which is connected to one end of a coil spring 12, the other end of which spring is fastened to a pin 33 on the lever 13. This spring 12 constantly tends to turn the lever 10 in a clockwise direction on the pivot 11, but the extent of such clockwise movement is limited by a stop pin 20 projecting from the side of the lever 13 in a position to overlie the main or nose end of the lever 10 to limit its maximum clockwise movement with respect to the lever 13. In Fig. 3, the lever 10 is shown in engagement with this pin 20, so that it can move no further in a clockwise direction relative to the lever 13, although both the lever 13 and the lever 10 together can move as a unit.

The previously mentioned disk 3 on the shaft 125 has, at one point of its periphery, a radial projection 4, and at another point on its periphery, a radial projection 5. On the inner lateral face of the radial projection 5 which is faced toward the levers 10 and 13, there is a circumferential groove 6, the mouth of which is somewhat flared or widened at both ends, especially the clockwise end, as well seen in Figs. 1 and 3. The corresponding inner lateral face of the radial projection 4 likewise has a circumferential groove 7, concentric with the shaft 125. An arcuate resilient leaf spring member 9, concentric with the shaft 125, is riveted or otherwise secured at one end to the extension 4, and extends arcuately almost to the other radial extension 5, stopping just short of the counterclockwise face 16 of the radial extension 5, which face 16 is slightly oblique or inclined to a radius as seen in the drawings.

On the nose of the lever 10 is a laterally extending pin 8 of such length as to extend to a plane within the thickness of the disk 3. When this pin 8 is at the same radial distance from the shaft 125 as the grooves 6 and 7, it does not interfere with turning the shaft 125 and the disk 3.

The normal operation of these parts, when it is desired both to feed the film and to tension the shutter, is as follows: The crank arm 1 normally comes to rest with the pin 8 against the face 16 of the radial projection 5, which engagement determines the normal rest position of the parts. This position is just a little to the left (counterclockwise) from the position shown in Fig. 3. At this time the pin 8 is not only against the face 16 of the projection 5, but also is riding on the top or outer periphery of the curved member 9, which holds the parts in an outward position, against the force of the spring 14, so that (through the pin 20) the nose 31 of the lever 13 is disengaged from the ratchet teeth and the shaft 125 is free to turn.

When the exposure has been completed and it is desired to wind the film and tension the shutter ready for the next exposure, the crank 1 is turned in a clockwise direction. This, through the gears 127, 129, and 131, turns the take-up spool 123 in a clockwise direction to wind the film. When the clockwise winding movement of the crank 1 has continued through roughly about a third of a revolution, the projection 4 will pass beyond the pin 8, but the nose 31 of the lever 13 still cannot drop down except to a very slight extent, because the tail 29 of this lever will be riding on a smooth or high part of the periphery of the metering disk 25 until the next notch 27 thereof comes around to a position opposite the tail 29, just as the winding of one frame of the film is completed.

At this time, which occurs at more than a half revolution but less than one full revolution of the shaft 125, the spring 14 will cause the tail 29 to enter the notch 27 of the metering disk, and this will allow the nose 31 to enter one of the ratchet teeth on the disk 2, stopping further clockwise rotation of the winding parts. At this time, the position of the pin 8 on the lever 10 will be determined by engagement of the lever 10 with the pin 20 on the lever 13, and the pin 8 will lie at a radial distance from the shaft 125 which is somewhat below the radial distance of the top arcuate surface of the curved spring 9, but above the inner or bottom arcuate surface of the member 9.

The operator now reverses the direction of rotation of the crank 1, turning it in a counterclockwise direction to restore the parts to the initial rest position. As the counterclockwise rotation continues, the inclined cam surface 15 at the leftward or counterclockwise end of the projection 4, will engage the pin 8 and cam this pin radially outwardly (thereby also, through the pin 20, raising the entire lever 13 against the force of the spring 14) and during the remainder of the counterclockwise rotation the pin 8 will ride along the arcuate outer surface of the spring 9, until the surface 16 of the projection 5 comes against the pin and stops further counterclockwise rotation, determining the rest position of the parts as already mentioned above. During this rotation of the parts first in one direction and then in the other, through at least half a revolution and frequently more, the shutter has been tensioned by means of the action of the crank pin 141 and link 143 in moving the arm 147. The shutter release or trigger 111 may now be pressed, to make the exposure.

If the exposure has been made satisfactorily and it is desired to take another picture on another frame of the film, the same operation is repeated, first turning the crank clockwise to wind the film, then turning it back counterclockwise to its normal rest position where it is stopped by engagement of the pin 8 with the face 16. However, if the exposure has not been made satisfactorily (e. g., the flashlamp has failed to ignite) so that the operator desires to make another exposure on the same frame of film, without further film winding, then this can be done according to the present invention. All that is needed is to displace the arcuate member 9 in some suitable way so that the spring 14 may be allowed to turn the lever 13 so as to carry the lever 10 and pin 8 inwardly toward the shaft 125, sufficiently so that pin 8 no longer obstructs the shoulder 16 on the projection 5 but rather lies opposite the mouth of the groove 6. The crank 1 may then be turned in a counterclockwise direction, since the pin 8 will pass through the groove 6, and the counterclockwise turning, as already explained above, will serve to tension or cock the shutter but will not wind the film.

This displacement of the arcuate member 9 to allow the pin 8 to drop downwardly to the proper radial distance to pass through the groove 6, may be accomplished in various ways. In the form of the invention shown in Figs. 1–5, the arcuate member 9 is, as above stated, a resilient spring fastened to the projection 4 at its counterclockwise end and free or unsupported at its clockwise end. Therefore, it is only necessary to displace or flex the clockwise end of the resilient arcuate member 9, in a lateral direction (axially of the shaft 125) in order to allow the pin 8 to drop down. This is accomplished by providing on the camera body a slide member 17, having an inclined cam surface 18 at its lower end, and having at its upper end an outwardly bent finger piece 19 which projects through a slot in the side wall of the camera and is accessible to the finger of the operator. A spring 26 normally tends to lift the slide 17. When the finger piece 19 is depressed, the inclined cam portion 18 thereof will displace the resilient arcuate member 9 in a manner readily seen from Fig. 5 of the drawings, moving it in a direction axially of the shaft 125 until the pin 8 can slip past.

When the arcuate member 9 is displaced in this manner, to allow the pin 8 to drop closer to the center of the shaft 125, the parts again become locked against turning movement in a clockwise direction, because the tail 29 of the lever 13 drops back into the same notch 27 in which it was last seated, and the nose 31 thereof drops again into engagement with the ratchet teeth of the ratchet wheel 2. But as above stated, counterclockwise rotation of the parts is possible, and is continued through one full revolution. After a short amount of rotation, the part 5 and slot 6 pass beyond the pin 8 so that the pin may rise slightly under the influence of the spring 12, until the lever 10 hits the pin 20. (It was cammed downwardly slightly at the beginning of the counterclockwise rotation, by the inclination at the left end of the slot 6.) At approximately two-thirds of a revolution from the rest position, the pin 8 is cammed up to the top surface of the arcuate member 9 by the inclined cam 15, and thereafter rides along the top arcuate surface until further counterclockwise rotation is stopped by engagement of the pin 8 with the face 16 of the projection 5. This upward camming of the pin 8 by the cam 15 acts through the pin 20 to raise the nose 31 of the lever 13, against the force of the spring 14, thus freeing the ratchet 2 for clockwise turning on the next occasion.

At the beginning of the winding of the film in the camera, ready for the first exposure, and also at the end of the film winding, after making the last exposure, several successive revolutions of the crank 1 in a clockwise direction are needed for winding the film. The mechanism whereby this may be accomplished is well understood (e. g., in said U. S. Patent 2,148,636) and need not be described here. It is sufficient to say that the parts constructed according to the present invention do not interfere with this turning of the crank through several successive revolutions at the proper time. When the parts are turned clockwise through more than one revolution, as the projection 5 comes around to the pin 8 the flared forward end of the groove 6 will cam the pin 8 downwardly against the force of the spring 12 so that the pin 8 will enter the groove or slot, but the lever 13 will not move downwardly because the tail 29 thereof is still riding on the smooth periphery of the disk 25, before reaching the first notch 27. During approximately the next third of a revolution the pin 8 will ride on the inner arcuate surface of the arcuate member 9, approximately in the position shown in Fig. 1, and will pass through the groove or slot 7 in the member 4. When the pin 8 passes beyond the projection 4, it will move slightly outwardly away from the shaft 125, but if the clockwise turning is continued, the widened or cam-like mouth of the slot 6 will again cam the pin 8 slightly inwardly toward the shaft 125.

In the construction thus far described, the pin 8 is released to drop down to a position within the effective range (in a counterclockwise direction) of the groove 6 by displacing the arcuate member 9 in the direction of the thickness of this member, or a direction axially of the shaft 125. However, in the alternative construction shown in Figs. 7–9, the dropping or release of the pin 8 is accomplished by displacing the arcuate member 9 in a circumferential direction rather than an axial direction, so as to create a gap between the end of the member 9 and the projection 5, through which gap the pin 8 may drop. Otherwise the action is the same as before.

Referring now to Figs. 7, 8, and 9, in which many of the corresponding parts are designated by the same reference numerals used in the previous embodiment and thus require no separate explanation, the arcuate member is here designed by the numeral 209 instead of 9. Instead of mounting the arcuate member rigidly with respect to the disk 3 (here designated as 203) it is mounted on a separate hub member 261 capable of limited rotation on the shaft 125 with respect to the member 203. A spring 263 acting between the parts 203 and 261 tends to turn the latter constantly in a clockwise direction relative to the former, so as to hold the right hand end or clockwise end of the arcuate member 209 tight against the face 216 of the projection 205 on the disk member 203.

Also rotatable on the shaft 125, arranged axially outwardly from the disk 203 and extending through the side wall of the camera body, is an actuating member 265 having some externally accessible serrations or teeth 267 which may be engaged by the finger of the operator. At one point, this member 265 has a tooth 269 which engages in a groove 271 of the member 261, to couple the parts together for joint rotation.

When it is desired to turn the shaft 125 in a counterclockwise direction to tension the shutter without winding the film, the operator places his finger against the teeth or serrations 267 and turns them in a counterclockwise direction, which, through the connection 269, 271, will cause a corresponding counterclockwise movement of the hub 261 carrying with it the arcuate member 209. The normal rest position of the parts is shown in Fig. 8, and it is seen that the pin 8 on the lever 10 is lying against the surface 216 of the disk 203. If now the toothed part 267 is turned slightly in a counterclockwise direction, the arcuate member 209 will be slightly turned counterclockwise relative to the now stationary parts 205, 216, and will open up a slight gap between the right hand or clockwise end of the arcuate member 209 and the member 205, as shown in Fig. 9. This will permit the pin 8 to drop downwardly so that it comes opposite an inclined part of the groove or notch 206, and will no longer interfere with the desired counterclockwise turning the shaft 125 and parts 203, 205, etc. The turning force on the teeth 267 can then be released, and the crank 1 can be turned counterclockwise to tension the shutter, just as in the previous embodiment of the invention.

This application is a continuation in part of the copending U. S. patent application of Richard Weiss, Serial No. 227,619, filed May 22, 1951, now abandoned.

Reference is made to British Patent 499,544 ("accepted" Jan. 25, 1939) to the firm which is assignee of the present application and to the corresponding German Patent 685,301 of Dec. 15, 1939. In said British and German patents, however, the winding crank can be turned in a counterclockwise direction only as far as its normal rest position, and there is no provision for releasing the pin 13 of said British and German patents from the shoulder or abutment 6 thereof (corresponding in part to the pin 9 and shoulder 16 or 216 of the present application) so as to permit counterclockwise rotation for tensioning the shutter without winding the film.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a manually operable rotary member effective upon rotation in a first direction to feed film and tension a shutter and effective upon rotation in a second direction to tension said shutter without feeding film, an abutment on said rotary member, a stop lever, means normally holding said stop lever in position to engage said abutment during rotation of said rotary member in said second direction to stop such rotation in a normal rest position determined by engagement of said stop lever with said abutment, and means for displacing said stop lever to a non-obstructing position with relation to said abutment, so that said rotary member may be turned in said second direction beyond its said rest position, when it is desired to tension said shutter without feeding film.

2. A photographic camera comprising a shutter, a tensioning member movable to tension said shutter ready for making an exposure, a film spool winding member, a rotary driving member operatively connected to said spool winding member through a one-way driving connection so that rotation of said driving member in a first direction will turn said spool winding member and rotation of said driving member in a second direction will be ineffective to turn said winding member, an operative connection between said driving member and said tensioning member effective upon rotation of said driving member in either direction to move said tensioning member to tension the shutter, an abutment portion on said driving member, a movable stop member normally lying in the path of travel of said abutment portion to contact therewith to determine a normal rest position of said driving member and to prevent rotation thereof in said second direction beyond said rest position, and a manually operable release member for releasing said stop member from said abutment portion to permit said driving member to turn in said second direction to tension the shutter without turning said spool winding member.

3. A photographic camera comprising a shutter, a tensioning member movable to tension said shutter ready for making an exposure, a film spool winding member, a rotary driving member operatively connected to said spool winding member through a one-way driving connection so that rotation of said driving member in a first direction will turn said spool winding member and rotation of said driving member in a second direction will be ineffective to turn said winding member, an operative connection between said driving member and said tensioning member effective upon rotation of said driving member in either direction to move said tensioning member to tension the shutter, an abutment portion on said driving member at a predetermined radial distance from the axis of rotation thereof, a stop member having a part movable to various radial distances form said axis, at one of which distances it lies in the path of travel of said abutment portion to contact therewith to determine a normal rest position of said driving member and to prevent rotation thereof in said second direction beyond said rest position, a spring tending to move said part to a different radial distance in non-obstructing relation to said abutment portion, and an arcuate member mounted on and turning bodily with said driving member for engaging said stop member to hold said part at said one radial distance so as to engage and obstruct said abutment portion, said arcuate member being displaceable to an ineffective position with relation to said stop member so that said spring may move said part to nonobstructing relation to said abutment portion, whereupon said driving member may turn in said second direction to tension the shutter without turning said spool winding member.

4. A construction as defined in claim 3, in which said arcuate member is resilient and is displaceable in a direction axially of said driving member.

5. A construction as defined in claim 3, in which said arcuate member is displaceable circumferentially with respect to said driving member.

6. A photographic camera of the type having interconnected film feed and shutter setting mechanism including an operating lever movable in either one of two opposite directions and effective upon a predetermined extent of movement in either direction to tension the shutter and effective upon a predetermined extent of movement in only the first one of said directions to feed the film, characterized by a disengageable stop normally preventing movement of said lever in the second direction beyond a predetermined rest position, a cam member for retaining said stop in an effective position for determining said rest position, and means for displacing said cam member to shift said stop to an ineffective position so that said operating lever may move in said second direction beyond the rest position determined by said stop.

7. A construction as defined in claim 6, in which said cam member is displaced in a rotary direction with respect to said operating lever.

8. A construction as defined in claim 6, in which said cam member is resilient and is displaced in a direction axially of the axis of rotation of said operating lever.

9. A structure as defined in claim 6, in which said stop is in the form of a pin extending in a direction approximately parallel to the axis of oscillation of said operating lever, and in which said cam member is displaceable in said direction from a piston engaging said pin to a position beyond the end of said pin.

10. A structure as defined in claim 9, further including spring means tending to move said pin to an ineffective position, said cam member being arranged to hold said pin in an effective position, so that when said cam member is displaced to a position beyond the end of said pin, said spring means will move said pin to an ineffective position.

11. A structure as defined in claim 10, further including a cam slide effective to displace said cam member beyond the end of said pin.

12. A photographic camera with interconnected film feeding and shutter tensioning means comprising rotary hand crank means effective upon rotary movement in only a first direction to feed the film and effective upon rotary movement in either direction to tension the shutter, stop means normally effective to prevent rotation of said hand crank means in a second direction beyond a predetermined rest position, said stop means including an abutment shoulder operatively connected to said hand crank means to turn therewith, a pivoted lever, a stop pin on said lever, spring means tending to shift said lever to move said stop pin out of the effective path of said shoulder, a movable element holding said pin in the path of said shoulder against the force of said spring means, and means for displacing said movable element to a position in which said spring means may move said stop pin relative to said shoulder.

References Cited in the file of this patent

FOREIGN PATENTS

| | | |
|---|---|---|
| 499,544 | Great Britain | Jan. 25, 1939 |
| 477,102 | Italy | Jan. 12, 1953 |
| 1,036,324 | France | Apr. 22, 1953 |